United States Patent
Yu

(10) Patent No.: US 9,191,478 B2
(45) Date of Patent: Nov. 17, 2015

(54) DIGITAL WIRELESS INTERCOM SYSTEM AND DRIVING METHOD THEREOF

(75) Inventor: Chang-Nam Yu, Seoul (KR)

(73) Assignee: LAON TECHNOLOGY CO., LTD., Gyeonggi-do (KR)

(*) Notice: Subject to any disclaimer, the term of this patent is extended or adjusted under 35 U.S.C. 154(b) by 214 days.

(21) Appl. No.: 13/817,450

(22) PCT Filed: Aug. 18, 2011

(86) PCT No.: PCT/KR2011/006077
§ 371 (c)(1),
(2), (4) Date: Jul. 8, 2013

(87) PCT Pub. No.: WO2012/023815
PCT Pub. Date: Feb. 23, 2012

(65) Prior Publication Data
US 2013/0272275 A1    Oct. 17, 2013

(30) Foreign Application Priority Data

Aug. 19, 2010 (KR) ........................ 10-2010-0080506

(51) Int. Cl.
*H04M 1/725* (2006.01)
*H04W 56/00* (2009.01)
*H04W 88/08* (2009.01)

(52) U.S. Cl.
CPC ........ *H04M 1/72513* (2013.01); *H04W 56/001* (2013.01); *H04W 88/085* (2013.01)

(58) Field of Classification Search
CPC ............ H04M 1/725; H04M 1/72513; H04W 56/001; H04W 88/085
USPC ................................................ 370/336, 337
See application file for complete search history.

(56) References Cited

U.S. PATENT DOCUMENTS 5,920,557 A * 7/1999 Hirata .......................... 370/350
6,205,338 B1    3/2001 Kim
(Continued)

FOREIGN PATENT DOCUMENTS

JP       2004-531101      10/2004
KR   10-1995-0026137      9/1998

OTHER PUBLICATIONS

Clear-com, "Reference Manual for Tempest 2400 Wireless intercom System" 2009, Clear-com.*

(Continued)

*Primary Examiner* — Jae Y Lee
(74) *Attorney, Agent, or Firm* — Faegre Baker Daniels LLP

(57) ABSTRACT

The present invention provides a digital wireless intercom system including: at least one master base station; at least one remote base station connected to the at least one master base station wiredly through at least one of a local area network, a local area network infrastructure and an internet, the at least one remote base station transmitting and receiving a synchronization signal and a data signal of digital type with the at least one master base station; a plurality of first belt packs within a transmission radius of the at least one master base station, the plurality of first belt packs transmitting and receiving the synchronization signal and the data signal with the at least one master base station wirelessly; and a plurality of second belt packs within a transmission radius of the at least one remote base station, the plurality of second belt packs transmitting and receiving the synchronization signal and the data signal with the at least one remote base station wirelessly, wherein the at least one master base station and the at least one remote base station are driven with different independent frequencies based on a frequency interference situation, and wherein the synchronization signal and the data signal transmitted and received between the at least one master base station and the at least one remote base station have different starting timings of period.

16 Claims, 7 Drawing Sheets

(56) References Cited

U.S. PATENT DOCUMENTS

| | | | |
|---|---|---|---|
| 7,002,995 B2* | 2/2006 | Chow et al. | 370/485 |
| 2001/0041594 A1* | 11/2001 | Arazi et al. | 455/561 |
| 2003/0058883 A1* | 3/2003 | Larson et al. | 370/463 |
| 2003/0092453 A1 | 5/2003 | Mills et al. | |
| 2006/0159073 A1 | 7/2006 | Chun | |
| 2007/0202926 A1* | 8/2007 | Gilmore et al. | 455/567 |
| 2011/0302390 A1* | 12/2011 | Copeland et al. | 712/2 |

OTHER PUBLICATIONS

International Search Report dated Mar. 28, 2012 in corresponding PCT International Application No. PCT/KR2011/006077.
Clear-Com Communication Systems, Reference Manual for Tempest 2400, Jul. 18, 2011.
Office Action dated Jul. 15, 2011 in Korean Application No. 10-2010-0080506.

* cited by examiner

DIGITAL WIRELESS INTERCOM SYSTEM AND DRIVING METHOD THEREOF

CROSS-REFERENCE TO RELATED APPLICATION

This application is a national stage application of International Application No. PCT/KR2011/006077, filed Aug. 18, 2011, which claims priority to KR 10-2010-0080506, filed Aug. 19, 2010, the disclosures of which are expressly incorporated herein by reference.

TECHNICAL FIELD

The present invention relates to a digital wireless intercom system, and more particularly, to a digital wireless intercom system including a master base station (MBS) and at least one remote base station (RBS) that communicate with each other wiredly and communicate with at least one belt pack (BP) wirelessly in an independent synchronization state and a driving method of the digital wireless intercom system.

BACKGROUND ART

Recently, as a digital wireless intercom system that supplements drawback of an analog wireless intercom system using a very high frequency (VHF) band and a ultra high frequency (UHF) band, a digital wireless intercom system using a scientific and medical (ISM) band of about 900 MHz/2.4 GHz and an unlicensed national information infrastructure (UNII) band of about 5 GHz that are useful without a license has been widely developed.

In addition, as a standard of a wireless local area network (WLAN) next to an existing IEEE 802.11n WLAN, standardization of IEEE 802.11ac and IEEE 802.11ad that support a multiple access and a speed over 1 Gbps and have a tightened power saving specification for portable device has been actively performed.

The digital wireless intercom system has several advantages. For example, an audio data of high sound quality may be transmitted with a high data transmission speed. In addition, audio channels that can be simultaneously used by a method such as a time division method may be obtained. Further, various value added service may be provided.

Regardless of the advantages, the digital wireless intercom system has a disadvantage such that a distance of wireless communication is shorter than that of the analog wireless intercom system using the VHF band and the UHF band.

In addition, since the ISM band and the UNII band are useful by everyone without limitation in purposes with various devices using a wireless technology such as a digital enhanced cordless telecommunications (DECT), a WLAN, a Bluetooth and a frequency shift keying (FSK), frequency bands having relatively low interference have different characteristics according to service area and service time. As a result, the digital wireless intercom system using the ISM band and the UNII band has a disadvantage such that an optimum frequency band having relatively low interference can not be always used through an equal frequency according to service area and service time.

For the purpose of overcoming the limitation in a distance of wireless communication of the digital wireless intercom system, a method of expanding a distance of wireless communication by installing antennas at various points has been suggested. The digital wireless intercom system including antennas according to the related art will be illustrated with reference to a drawing.

FIG. 1 is a view showing a digital wireless intercom system according to the related art.

In FIG. 1, a digital wireless intercom system 10 according to the related art includes a base station (BS) 20, an antenna splitter 30, first and second active antennas 40 and 42, a plurality of first belt packs 50, a plurality of second belt packs 52 and a plurality of third belt packs 54.

The antenna splitter 30 is connected to the base station 20 wiredly, and the first and second active antennas are connected to the antenna splitter 30 wiredly.

The plurality of first belt packs 50 are located within a first transmission radius R1 that is a distance of wireless communication of the base station 20. In addition, the plurality of second belt packs 52 are located within a second transmission radius R2 that is a distance of wireless communication of the first active antenna 40, and the plurality of third belt packs 54 are located within a third transmission radius R3 that is a distance of wireless communication of the second active antenna 42.

As a result, while the plurality of first belt packs 50 within the first transmission radius R1 of the base station 20 transmits and receives an audio data with the base station 20 wirelessly, the plurality of second belt packs 52 and the plurality of third belt packs 54 outside the first transmission radius R1 of the base station 20 can not directly transmit and receive the audio data with the base station wirelessly.

In this case, although the plurality of second belt packs 52 and the plurality of third belt packs 54 are located at a shadowed area of the base station 20, the plurality of second belt packs 52, the plurality of third belt packs 54 and the base station 20 transmit and receive the audio data with each other wirelessly by expanding the distance of wireless communication of the base station 20 using the first and second active antennas 40 and 42 connected to the base station 20 wiredly through the antenna splitter 30.

In the digital wireless intercom system 10 according to the related art, accordingly, the limitation in a distance of wireless communication may be improved to a certain extent by eliminating the shadowed area of the base station 20 using the first and second active antennas 40 and 42.

However, although an unshielded twisted pair (UTP) cable may be used for a connection line between the base station 20 and the antenna splitter 30 and a connection line between the antenna splitter 30 and the first and second active antennas 40 and 42, a quality of wireless communication may be deteriorated by a length of the connection lines to cause a phenomenon such as a sound disconnection due to delay. In addition, an Ethernet (, which is referred to as a local area network (LAN)) and an infrastructure that are already installed in a building may not be used due to different protocols.

Further, the additional antenna splitter 30 and the additional first and second active antennas 40 and 42 are required, and the additional antenna splitter 30 and the first and second active antennas 40 and 42 are required to be connected through the additional UTP cables.

Since additional equipments are required to expand the distance of wireless communication, installation cost and maintenance cost increase and utilization and generalization have their limitations.

Moreover, an additional signal converting unit is required even when the digital wireless intercom system 10 according to the related art is connected to an internet.

Although the digital wireless intercom system according to the related art has advantages such as the high sound quality due to the high data transmission speed and the multiple audio channels due to the time division method, the digital wireless intercom system according to the related art has disadvantages such as the short distance of wireless communication and the frequency interference. As a result, the digital wireless intercom system according to the related art is restrictively applied to a broadcasting system of high price, and general application of the digital wireless intercom system according to the related art to a building such as a restaurant has a serious obstacle.

DETAILED ILLUSTRATION OF INVENTION

Technical Problem

The present invention has been made in an effort to solve the problems occurring in the related art, and an object of the present invention is to provide a digital wireless intercom system and a driving method of the digital wireless intercom system where a communication distance expands and a frequency interference and communication quality are improved due to elimination of a wireless shadowed area by a master base station and at least one remote base station that transmit and receive a data signal with each other wiredly using an Ethernet and transmit and receive a data signal of digital type with at least one belt pack wirelessly in an independent synchronization state.

In addition, another object of the present invention is to provide a digital wireless intercom system and a driving method of the digital wireless intercom system where a mutual independency is kept by communication in asynchronization state between a master base station and at least one remote base station and deterioration in quality such as disconnection phenomenon due to signal delay varying according to a traffic situation of a network is prevented by an internal memory of the base station and the at least one remote base station when a data signal of digital type is transmitted by a time division method including a plurality of transmission frames.

Technical Solution

In order to achieve the above object, the present invention provides a digital wireless intercom system including: at least one master base station; at least one remote base station connected to the at least one master base station wiredly through at least one of a local area network, a local area network infrastructure and an internet, the at least one remote base station transmitting and receiving a synchronization signal and a data signal of digital type with the at least one master base station; a plurality of first belt packs within a transmission radius of the at least one master base station, the plurality of first belt packs transmitting and receiving the synchronization signal and the data signal with the at least one master base station wirelessly; and a plurality of second belt packs within a transmission radius of the at least one remote base station, the plurality of second belt packs transmitting and receiving the synchronization signal and the data signal with the at least one remote base station wirelessly, wherein the at least one master base station and the at least one remote base station are driven with different independent frequencies based on a frequency interference situation, and wherein the synchronization signal and the data signal transmitted and received between the at least one master base station and the at least one remote base station have different starting timings of period.

Here, the synchronization signal and the data signal may be transmitted and received by a time division wireless communication method having a same transmission frame structure.

In addition, the at least one master base station and the at least one remote base station may add an available frame information regarding a plurality of transmission frames available to the synchronization signal. The at least one master base station and the at least one remote base station may transmit the synchronization signal to the plurality of first belt packs and the plurality of second belt packs, respectively. The plurality of first belt packs and the plurality of second belt packs may select one of the plurality of transmission frames using the available frame information. The plurality of first belt packs and the plurality of second belt packs may add a used frame information regarding the selected one of the plurality of transmission frames to the data signal. The plurality of first belt packs and the plurality of second belt packs may transmit the data signal to the at least one master base station and the at least one remote base station, respectively.

Further, the at least one master base station may generate an updated available frame information by synthesizing and editing the used frame information, and wherein the at least one master base station transmits the updated available frame information to the at least one remote base station every period or every time the available frame information is updated.

In addition, the at least one master base station and the at least one remote base station may include a buffer memory by transmission frame for compensating the different starting timings of period and a wired delay. The buffer memory may include a plurality of variable buffers a capacity of which is capable of being varied.

Further, after the at least one master base station and the at least one remote base station recover an error of the data signal received from the plurality of first belt packs and the plurality of second belt packs, the at least one master base station and the at least one remote base station may transmit the data signal to each other wiredly.

In addition, the at least one master base station may transmit an auxiliary synchronization signal to the at least one remote base station wiredly. The at least one remote base station may keep a synchronization state with the at least one master base station using the auxiliary synchronization signal.

Further, the plurality of first belt packs and the plurality of second belt packs may select the data signal corresponding to a predetermined audio group. The plurality of first belt packs and the plurality of second belt packs may mix and simultaneously output the data signal.

In addition, the at least one master base station may include a plurality of master base stations transmitting and receiving the synchronization signal and the data signal with each other wiredly. The at least one remote base station may include a plurality of remote base stations transmitting and receiving the synchronization signal and the data signal with the plurality of master base stations wiredly.

Further, the at least one master base station includes: a wired interfacing unit transmitting and receiving the data signal wiredly; a wireless receiving unit receiving the data signal wirelessly; an error recovery calculating unit receiving the data signal from the wireless receiving unit and recovering an error of the data signal; a wireless transmitting unit transmitting the data signal wirelessly; a first codec unit receiving the data signal of digital type from the wired interfacing unit and the error recovery calculating unit and converting the data signal of digital type to the data signal of analog type; an analog signal outputting unit receiving the data signal of analog type from the first codec unit and transmitting the data signal of analog type to an audio output device; an analog signal inputting unit receiving the data signal of analog type from an audio input device; a second codec unit receiving the data signal of analog type from the analog signal inputting unit and converting the data signal of analog type to the data signal of digital type; and a controlling unit controlling the wired interfacing unit, the wireless receiving unit and the wireless transmitting unit.

In addition, the at least one master base station further includes: a first mixer synthesizing the data signal and transmitting the data signal to the audio output device; and a second mixer receiving the data signal from the audio input device and synthesizing the data signal.

Further, the at least one remote base station includes: a wired interfacing unit transmitting and receiving the data signal wiredly; a wireless receiving unit receiving the data signal wirelessly; an error recovery calculating unit receiving the data signal from the wireless receiving unit and recovering an error of the data signal; a wireless transmitting unit transmitting the data signal wirelessly; and a controlling unit controlling the wired interfacing unit, the wireless receiving unit and the wireless transmitting unit.

In addition, each of the plurality of first belt packs and the plurality of second belt packs includes: a wireless receiving unit receiving the data signal wirelessly; an error recovery calculating unit receiving the data signal from the wireless receiving unit and recovering an error of the data signal; a wireless transmitting unit transmitting the data signal wirelessly; a first codec unit receiving the data signal of digital type from the error recovery calculating unit and converting the data signal of digital type to the data signal of analog type; an analog signal outputting unit receiving the data signal of analog type from the first codec unit and transmitting the data signal of analog type to an audio output device; an analog signal inputting unit receiving the data signal of analog type from an audio input device; a second codec unit receiving the data signal of analog type from the analog signal inputting unit and converting the data signal of analog type to the data signal of digital type; and a controlling unit controlling the wireless receiving unit and the wireless transmitting unit.

Effect of Invention

In a digital wireless intercom system and a driving method of the digital wireless intercom system according to the present invention, since a master base station and at least one remote base station are connected to each other wiredly using an Ethernet (LAN) and are connected to at least one belt pack wirelessly, a communication distance expands and a wireless shadowed area is eliminated by a general equipment.

In addition, the master base station and the at least one remote base station select independent frequencies that are different from each other and have no interference due to location thereof and transmit synchronization signals and data signals of digital type of the independent frequencies by a time division method where a start point of a period of a transmission frame has an asynchronization state. As a result, frequency interference is improved. Further, since the master base station and the at least one remote base station include internal memory buffers for wired reception corresponding to the number of transmission frames, deterioration in quality such as disconnection phenomenon due to wired delay is prevented.

EMBODIMENT OF INVENTION

Reference will now be made in detail to the preferred embodiments, examples of which are illustrated in the accompanying drawings.

Figure 1:
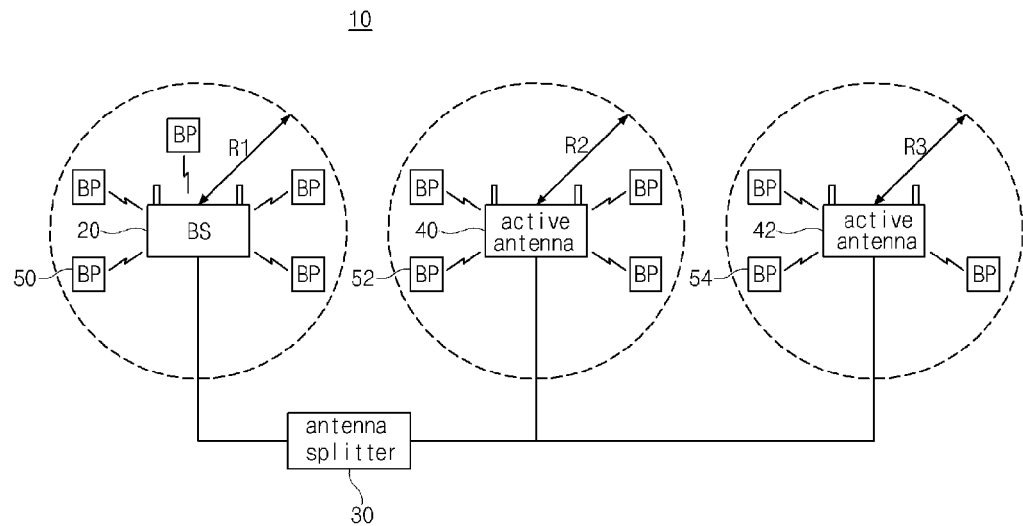
FIG. 1 is a view showing a digital wireless intercom system according to the related art.
Figure 2:
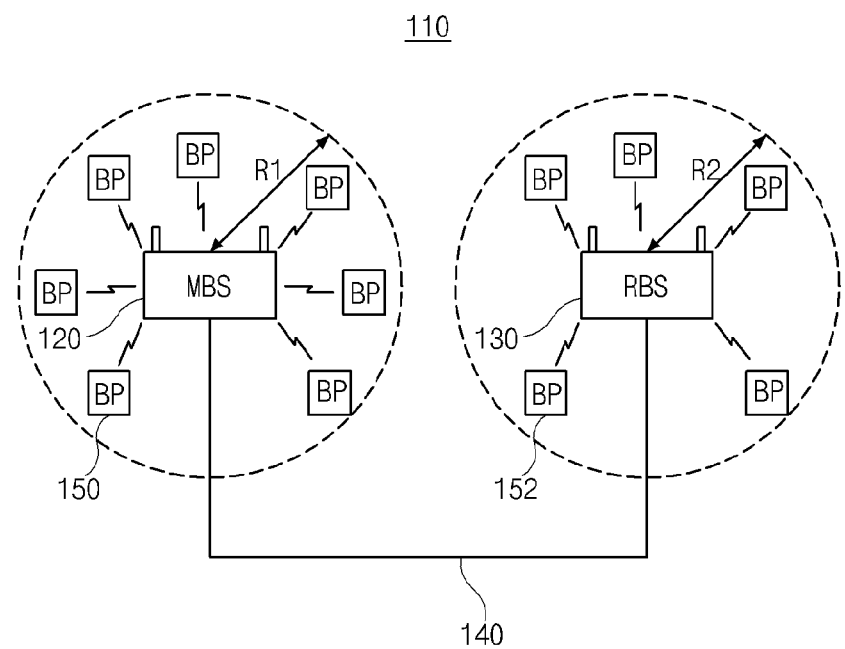
FIG. 2 is a view showing a digital wireless intercom system according to a first embodiment of the present invention.

FIG. 2 is a view showing a digital wireless intercom system according to a first embodiment of the present invention.

In FIG. 2, a digital wireless intercom system 110 according to a first embodiment of the present invention includes a master base station (MBS) 120, at least one remote base station (RBS) 130, an Ethernet 140, a plurality of first belt packs (BP) 150 and a plurality of second belt packs (BP) 152.

The master base station 120 and the at least one remote base station 130 have first and second transmission radii R1 and R2, which are a distance of wireless communication, respectively, through different independent frequencies. The plurality of first belt packs 150 are located within the first transmission radius R1 of the master base station 120 such that the plurality of first belt packs 150 transmit and receive a synchronization signal for controlling synchronization and a data signal of digital type for an audio data. The plurality of second belt packs 152 are located within the second transmission radius R2 of the at least one remote base station 130 such that the plurality of second belt packs 152 transmit and receive the synchronization signal and the data signal of digital type.

Here, a plurality of audio call groups may be defined by a portion of the plurality of first belt packs 150 and the plurality of second belt packs 152. Each audio call group may be a collection of belt packs having an intention of transmitting and receiving an audio data with each other.

In addition, the master base station 120 and the at least one remote base station 130 are connected to each other wiredly through the Ethernet 140.

The Ethernet 140 is a computer network developed for a local area network (LAN) and may be simply referred to as a LAN.

Devices connected to the Ethernet 140 with distinct addresses may transmit and receive a data with each other, and a BNC cable, a shielded twisted pair (STP) cable and an unshielded twisted pair (UTP) cable may be used as a medium for transmitting a data.

Usually, the Ethernet 140 is installed in a building for data communication among computers of offices. In the digital wireless intercom system 110 according to the first embodiment of the present invention, since the master base station 120 and the at least one remote base station 130 are connected to each other wiredly using the Ethernet 140 that has been already installed in the building, installation cost and maintenance cost are reduced.

The master base station 120 and the plurality of first belt packs 150 within the first transmission radius R1 transmit and receive the data signal of digital type with each other (duplex communication) wirelessly through independent frequencies based on frequency interference situation.

In addition, the master base station 120 and the plurality of second belt packs 152 outside the first transmission radius R1 transmit and receive the data signal of digital type with each other (duplex communication) by wireless connection between the plurality of second belt packs 152 and the at least one remote base station 130 through the independent frequencies and by wired connection between the at least one remote base station 130 and the master base station 110 through the Ethernet 140.

As a result, the master base station 120 expands a distance of communication to the plurality of second belt packs 152 outside the first transmission radius R1 without additional installation cost and additional maintenance cost.

Further, the plurality of first belt packs 150 and the plurality of second belt packs 152 may transmit and receive the data signal of digital type with the master base station 120 or the at least one remote base station 130 wirelessly even when the plurality of first belt packs 150 and the plurality of second belt packs 152 change a position (hand-over).

For example, when one of the plurality of second belt packs 152 within the second transmission radius R2 of the at least one remote base station 130 moves to a position within the first transmission radius R1 of the master base station 120, the one of the plurality of second belt packs 152 may transmit and receive the data signal of digital type with the master base station 120 wirelessly through the independent frequency (duplex communication).

A structure of the master base station 120, the at least one remote base station 130 and the plurality of belt packs 150 and 152 of the digital wireless intercom system 110 will be illustrated in the accompanying drawings.

Figure 3:
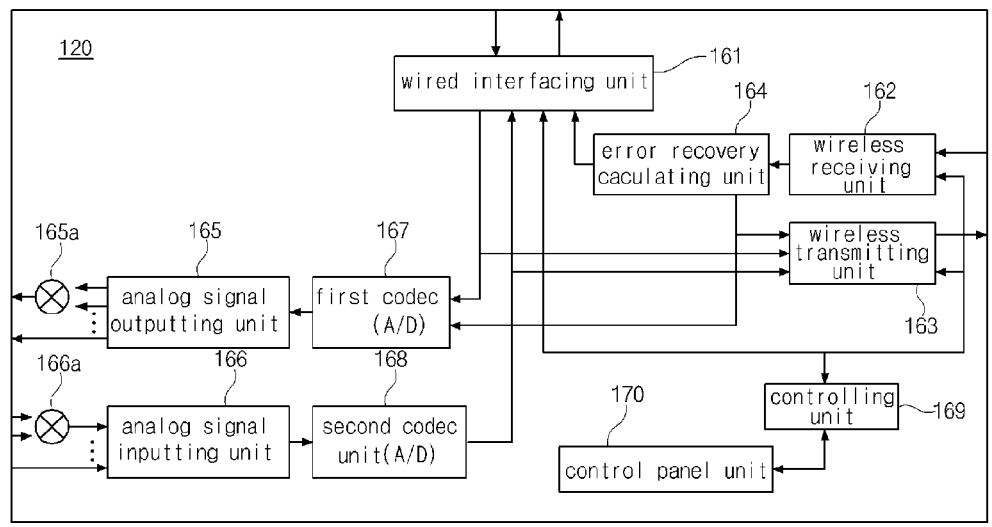
FIG. 3 is a view showing a master base station of a digital wireless intercom system according to a first embodiment of the present invention.
Figure 4:
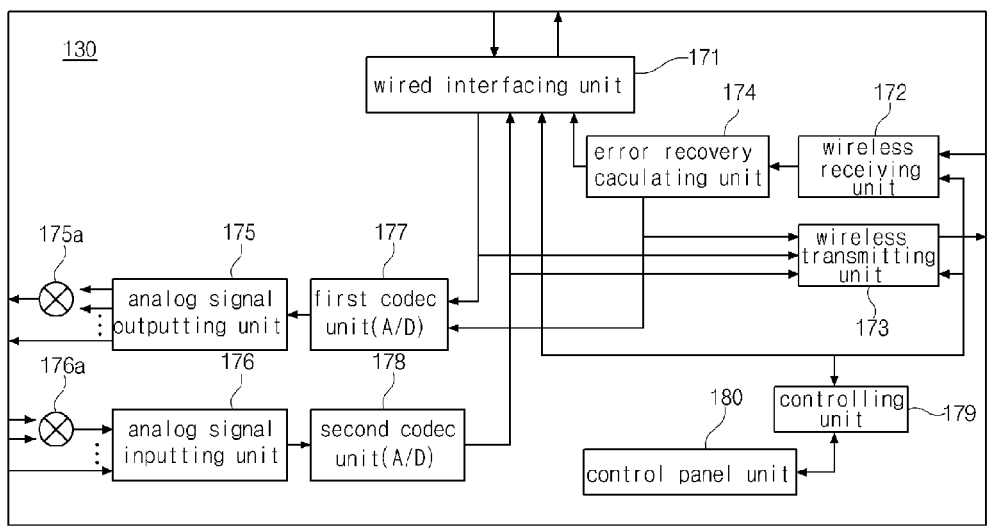
FIG. 4 is a view showing at least one remote base station of a digital wireless intercom system according to a first embodiment of the present invention.
Figure 5:
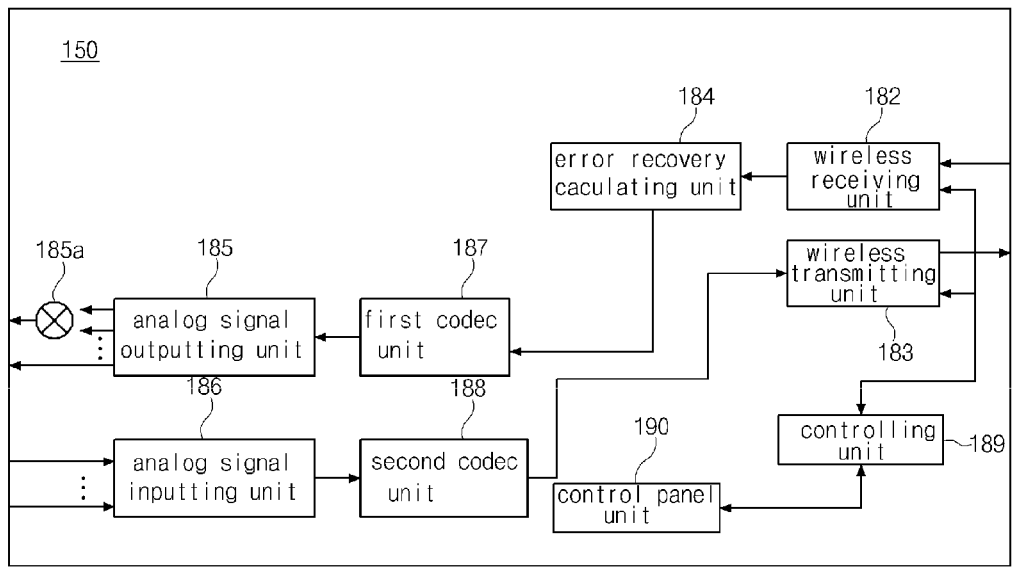
FIG. 5 is a view showing one of a plurality of first belt packs of a digital wireless intercom system according to a first embodiment of the present invention.

FIGS. 3, 4 and 5 are views showing a master base station, at least one remote base station and one of a plurality of first belt packs, respectively, of a digital wireless intercom system according to a first embodiment of the present invention. FIG. 5 exemplarily shows the first belt pack, and the second belt pack may have the same structure as the first belt pack.

In FIG. 3, the master base station 120 of the digital wireless intercom system according to the first embodiment of the present invention includes a wired interfacing unit 161, a wireless receiving unit 162, a wireless transmitting unit 163, an error recovery calculating unit 164, an analog signal outputting unit 165, an analog signal inputting unit 166, a first codec unit 167, a second codec unit 168, a controlling unit 169 and a control panel unit 170.

The wired interfacing unit 161 transmits and receives the data signal of digital type with the at least one remote base station 130 (of FIG. 2) connected to the master base station 120 wiredly. The wired interfacing unit 161 may modulate the received data signal of digital type to have a format adequate to a signal processing in the master base station 120 and may transmit the modulated data signal to the first codec unit 167 and the wireless transmitting unit 163. In addition, the wired interfacing unit 161 may receive the data signal from the second codec unit 168. The wired interfacing unit 161 may modulate the received data signal to have a format adequate to a transmission and may transmit the modulated data signal.

The wireless receiving unit 162 receives the data signal of digital type from the plurality of first belt packs 150 (of FIG. 2) connected to the master base station 120 wirelessly and transmits the received data signal to the error recovery calculating unit 164.

The wireless transmitting unit 163 receives the data signal from the wired interfacing unit 162, the error recovery calculating unit 164 and the second codec unit 168 and transmits the data signal of digital type and the synchronization signal to the plurality of first belt packs 150 connected to the master base station 120 wirelessly.

The error recovery calculating unit 164 receives the data signal from the wireless receiving unit 162 and recovers errors of the data signal occurring during signal transmission. The error recovery calculating unit 164 transmits the recovered data signal to the wired interfacing unit 161, the wireless transmitting unit 163 and the first codec unit 167.

The analog signal outputting unit 165 receives the data signal of analog type from the first codec unit 167 and transmits the data signal of analog type to an audio output device such as a speaker. The analog signal outputting unit 165 may synthesize a plurality of data signals through a first mixer 165a and may transmit the synthesized data signal. Alternatively, the analog signal outputting unit 165 may intactly transmit the data signal without additional modulation.

The analog signal inputting unit 166 receives the data signal of analog type from the audio input device such as a microphone and transmits the data signal of analog type to second codec unit 168. The analog signal inputting unit 166 may synthesize a plurality of data signals through a second mixer 166a and may receive the synthesized data signal. Alternatively, the analog signal inputting unit 166 may intactly receive the data signal without additional modulation.

The first codec unit 167 receives the data signal of digital type from the wired interfacing unit 161 and the error recovery calculating unit 164. The first codec unit 167 converts the data signal of digital type to the data signal of analog type (digital to analog: D/A) and transmits the data signal of analog type to the analog signal outputting unit 165.

The second codec unit 168 receives the data signal of analog type from the analog signal inputting unit 166. The second codec unit 168 converts the data signal of analog type to the data signal of digital type (analog to digital: A/D) and transmits the data signal of digital type to the wired interfacing unit 161 and the wireless transmitting unit 163.

The controlling unit 169, as a main function, controls the wired interfacing unit 161, the wireless receiving unit 162 and the wireless transmitting unit 163 according to a command of a user or a predetermined program. The control panel unit 170 receives the inputted command of the user and displays a result of execution of the command or a state of the master base station 120.

In addition, the controlling unit 169 may further control the error recovery calculating unit 164, the analog signal outputting unit 165, the analog signal inputting unit 166, the first codec unit 167 and the second codec unit 168. The controlling unit 169 may receive a necessary data from the wireless receiving unit 162 and may transmit the necessary data to the wireless transmitting unit 163.

In FIG. 4, the at least one base station 130 of the digital wireless intercom system according to the first embodiment of the present invention includes a wired interfacing unit 171, a wireless receiving unit 172, a wireless transmitting unit 173, an error recovery calculating unit 174, an analog signal outputting unit 175, an analog signal inputting unit 176, a first codec unit 177, a second codec unit 178, a controlling unit 179 and a control panel unit 180.

The wired interfacing unit 171 transmits and receives the data signal of digital type with the master base station 120 (of FIG. 2) connected to the at least one remote base station 130 wiredly. The wired interfacing unit 171 may modulate the received data signal of digital type to have a format adequate to a signal processing in the at least one remote base station 130 and may transmit the modulated data signal to the first codec unit 177 and the wireless transmitting unit 173. In addition, the wired interfacing unit 171 may receive the data signal from the second codec unit 178. The wired interfacing unit 171 may modulate the received data signal to have a format adequate to a transmission and may transmit the modulated data signal.

The wireless receiving unit 172 receives the data signal of digital type from the plurality of second belt packs 152 (of FIG. 2) connected to the at least one remote base station 130 wirelessly and transmits the received data signal to the error recovery calculating unit 174.

The wireless transmitting unit 173 receives the data signal from the wired interfacing unit 172, the error recovery calculating unit 174 and the second codec unit 178 and transmits the data signal of digital type and the synchronization signal to the plurality of second belt packs 152 connected to the at least one remote base station 130 wirelessly.

The error recovery calculating unit 174 receives the data signal from the wireless receiving unit 172 and recovers errors of the data signal occurring during signal transmission. The error recovery calculating unit 174 transmits the recovered data signal to the wired interfacing unit 171, the wireless transmitting unit 173 and the first codec unit 177.

The analog signal outputting unit 175 receives the data signal of analog type from the first codec unit 177 and transmits the data signal of analog type to an audio output device such as a speaker. The analog signal outputting unit 175 may synthesize a plurality of data signals through a first mixer 175a and may transmit the synthesized data signal. Alternatively, the analog signal outputting unit 175 may intactly transmit the data signal without additional modulation.

The analog signal inputting unit 176 receives the data signal of analog type from the audio input device such as a microphone and transmits the data signal of analog type to second codec unit 178. The analog signal inputting unit 176 may synthesize a plurality of data signals through a second mixer 176a and may receive the synthesized data signal. Alternatively, the analog signal inputting unit 176 may intactly receive the data signal without additional modulation.

The first codec unit 177 receives the data signal of digital type from the wired interfacing unit 171 and the error recovery calculating unit 174. The first codec unit 177 converts the data signal of digital type to the data signal of analog type (digital to analog: D/A) and transmits the data signal of analog type to the analog signal outputting unit 175.

The second codec unit 178 receives the data signal of analog type from the analog signal inputting unit 176. The second codec unit 178 converts the data signal of analog type to the data signal of digital type (analog to digital: A/D) and transmits the data signal of digital type to the wired interfacing unit 171 and the wireless transmitting unit 173.

The controlling unit 179, as a main function, controls the wired interfacing unit 171, the wireless receiving unit 172 and the wireless transmitting unit 173 according to a command of a user or a predetermined program. The control panel unit 180 receives the inputted command of the user and displays a result of execution of the command or a state of the at least one remote base station 130.

In addition, the controlling unit 179 may further control the error recovery calculating unit 174, the analog signal outputting unit 175, the analog signal inputting unit 176, the first codec unit 177 and the second codec unit 178. The controlling unit 179 may receive a necessary data from the wireless receiving unit 172 and may transmit the necessary data to the wireless transmitting unit 173.

Here, one or more of the analog signal outputting unit 175, the analog signal inputting unit 176, the first and second mixers 175a and 176a, the first and second codec units 177 and 178 and the control panel unit 180 may be omitted according to a field of application.

For example, when the at least one remote base station 130 is designed not to have an audio input and output function, the audio output device such as a speaker and the audio input device such as a microphone connected to the at least one remote base station 130 are omitted, and the analog signal outputting unit 175, the analog signal inputting unit 176, the first and second mixers 175a and 176a, the first and second codec units 177 and 178 may be omitted.

In FIG. 5, each of the plurality of first belt packs 150 of the digital wireless intercom system according to the first embodiment of the present invention includes a wireless receiving unit 182, a wireless transmitting unit 183, an error recovery calculating unit 184, an analog signal outputting unit 185, an analog signal inputting unit 186, a first codec unit 187, a second codec unit 188, a controlling unit 189 and a control panel unit 190.

The wireless receiving unit 182 receives the data signal of digital type from the master base station 120 (of FIG. 2) and transmits the received data signal to the error recovery calculating unit 184.

In addition, the wireless receiving unit 182 receives the synchronization signal of digital type from the master base station 120.

The wireless transmitting unit 183 receives the data signal from the second codec unit 188 and transmits the data signal of digital type to the master base station 120.

The error recovery calculating unit 184 receives the data signal from the wireless receiving unit 182 and recovers errors of the data signal occurring during signal transmission. The error recovery calculating unit 184 transmits the recovered data signal to the first codec unit 187.

The analog signal outputting unit 185 receives the data signal of analog type from the first codec unit 187 and transmits the data signal of analog type to an audio output device such as a speaker. The analog signal outputting unit 185 may synthesize a plurality of data signals through a first mixer 185a and may transmit the synthesized data signal. Alternatively, the analog signal outputting unit 185 may intactly transmit the data signal without additional modulation.

The analog signal inputting unit 186 receives the data signal of analog type from the audio input device such as a microphone and transmits the data signal of analog type to second codec unit 188.

The first codec unit 187 receives the data signal of digital type from the error recovery calculating unit 184. The first codec unit 187 converts the data signal of digital type to the data signal of analog type (digital to analog: D/A) and transmits the data signal of analog type to the analog signal outputting unit 185.

The second codec unit 188 receives the data signal of analog type from the analog signal inputting unit 186. The second codec unit 188 converts the data signal of analog type to the data signal of digital type (analog to digital: A/D) and transmits the data signal of digital type to the wireless transmitting unit 183.

The controlling unit 189, as a main function, controls the wireless receiving unit 182 and the wireless transmitting unit 183 according to a command of a user or a predetermined program. The control panel unit 190 receives the inputted command of the user and displays a result of execution of the command or a state of the master base station 120.

In addition, the controlling unit 189 may further control the error recovery calculating unit 184, the analog signal outputting unit 185, the analog signal inputting unit 186, the first codec unit 187 and the second codec unit 188. The controlling unit 189 may receive a necessary data from the wireless receiving unit 182 and may transmit the necessary data to the wireless transmitting unit 183.

Computers of offices in a building may be connected to a hub through the Ethernet 140 (of FIG. 2), and a plurality of hubs in the building may be connected to a building infrastructure (or a LAN infrastructure). A distance of communication of the digital wireless intercom system according to the present invention may expand to a belt pack in the other building by connecting the digital wireless intercom system to the building infrastructure (or the LAN infrastructure) and an internet through the Ethernet (or the LAN) and the hub, and the digital wireless intercom system will be illustrated in the accompanying drawing.

Figure 6:
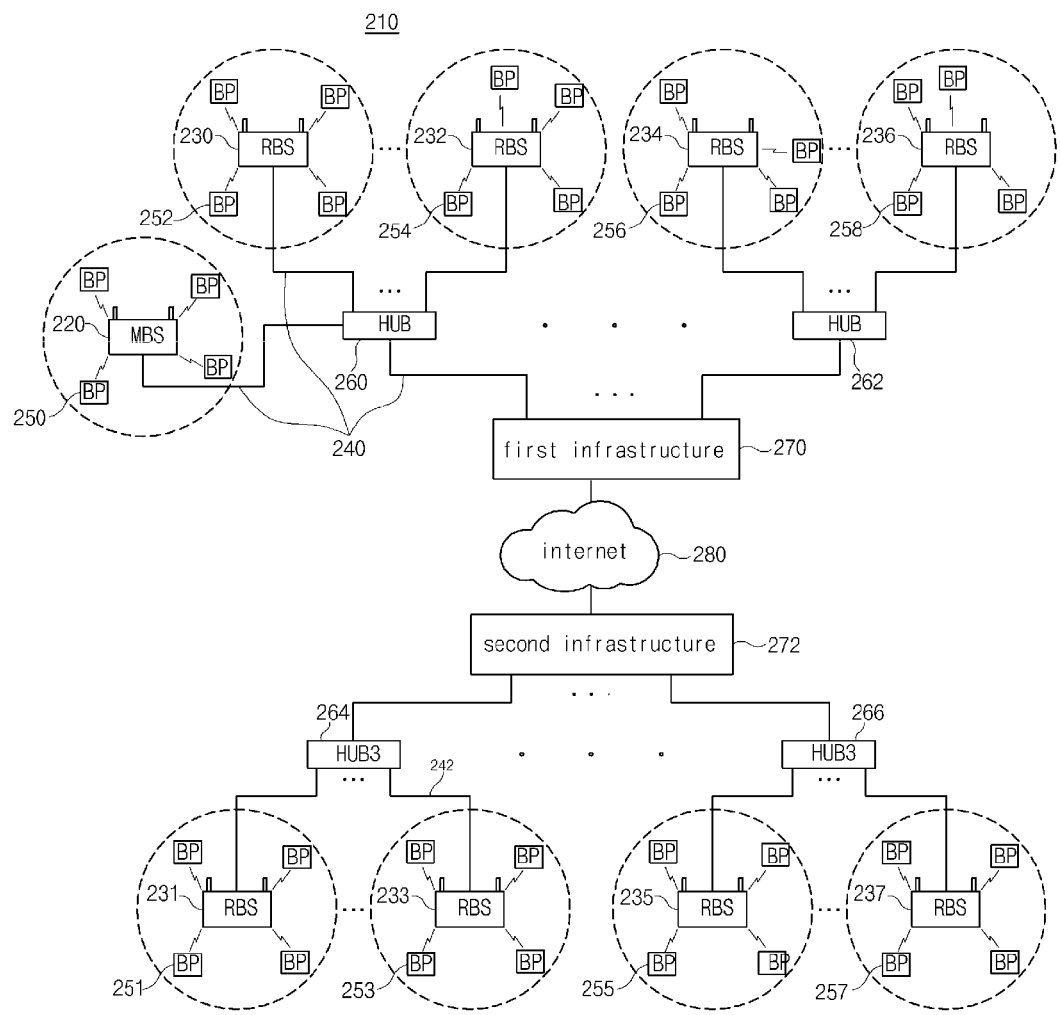
FIG. 6 is a view showing a digital wireless intercom system according to a second embodiment of the present invention.

FIG. 6 is a view showing a digital wireless intercom system according to a second embodiment of the present invention.

In FIG. 6, a digital wireless intercom system 210 according to a second embodiment of the present invention includes a master base station (MBS) 220, at least one first remote base station (RBS) 230, 232, 234 and 236, at least one second remote base station (RBS) 231, 233, 235 and 237, at least one first hub (HUB) 260 and 262, at least one second hub (HUB) 264 and 266, first and second infrastructures 270 and 272, an internet 280, a plurality of first to fifth belt packs (BP) 250, 252, 254, 256 and 258 and a plurality of sixth to ninth belt packs (BP) 251, 253, 255 and 257.

Although not shown, the master base station (MBS) 220, the at least one first remote base station (RBS) 230, 232, 234 and 236 and the at least one second remote base station (RBS) 231, 233, 235 and 237 have transmission radii, which are a distance of wireless communication, respectively.

The plurality of first belt packs 250 are located within the transmission radius of the master base station 120 through an independent frequency, and the plurality of second to fifth belt packs 252, 254, 256 and 258 are located within the transmission radius of the at least one first remote base station 230, 232, 234 and 236 through independent frequencies. The plurality of sixth to ninth belt packs 251, 253, 255 and 257 are located within the transmission radius of the at least one second remote base station 231, 233, 235 and 237 through independent frequencies. As a result, the plurality of first belt packs 250 receives a synchronization signal from the master base station 220 wirelessly, and transmits and receives a data signal of digital type with the master base station 220 wirelessly. The second to fifth belt packs 252, 254, 256 and 258 receives the synchronization signal from the at least one first remote base station 230, 232, 234 and 236 wirelessly, and transmits and receives the data signal of digital type with the at least one first remote base station 230, 232, 234 and 236 wirelessly. Further, the sixth to ninth belt packs 251, 253, 255 and 257 receives the synchronization signal from the at least one second remote base station 231, 233, 235 and 237 wirelessly, and transmits and receives the data signal of digital type with the at least one second remote base station 231, 233, 235 and 237 wirelessly.

Here, a plurality of audio call groups may be defined by a portion of the plurality of first to ninth belt packs 250, 252, 254, 256, 258, 251, 253, 255 and 257. The master base station 220 and the at least one first remote base station 230, 232, 234 and 236 are connected to each other through the first Ethernet 140 and the at least one first hub 260 and 262, and the at least one first hub 260 and 262 is connected to the first infrastructure 270 which is a data communication network of a first building (not shown).

The first infrastructure 270 may have been already installed in the first building for an internal data communication. For example, the at least one first hub 260 and 262 may be disposed in each office of the first building, and computers of each office may be connected to the at least one first hub 260 and 262 through the first Ethernet 240. The at least one first hub 260 and 262 may be connected to the first infrastructure 270 through the first Ethernet 240.

Accordingly, in the digital wireless intercom system 210 according to the second embodiment of the present invention, the master base station 220 and the at least one first remote base station 230, 232, 234 and 236 may transmit and receive the data signal of digital type with each other wiredly using the first Ethernet 240, the at least one first hub 260 and 262 and the first infrastructure 270 which have been already installed in the first building. As a result, the plurality of first to fifth belt packs 250, 252, 254, 256 and 258 within the transmission radii of the master base station 220 and the at least one first remote base station 230, 232, 234 and 236 may transmit and receive the data signal of digital type with each other wiredly and wirelessly.

Moreover, the first infrastructure 270 is connected to the second infrastructure 272 of a second building (not shown) through the internet 280.

Similarly to the first building, the at least one second hub 264 and 266 may be disposed in each office of the second building, and computers of each office may be connected to the at least one second hub 264 and 266 through the second Ethernet 242. The at least one second hub 264 and 266 may be connected to the second infrastructure 272 through the second Ethernet 242.

In addition, the at least one second remote base station 231, 233, 235 and 237 is connected to the second infrastructure 272 through the second Ethernet 242 and the at least one second hub 264 and 266.

Accordingly, in the digital wireless intercom system 210 according to the second embodiment of the present invention, the master base station 220 and the at least one second remote base station 231, 233, 235 and 237 may transmit and receive the data signal of digital type with each other wiredly using the first Ethernet 240, the at least one first hub 260 and 262 and the first infrastructure 270 which have been already installed in the first building and the second Ethernet 242, the at least one second hub 264 and 266 and the second infrastructure 272 which have been already installed in the second building. As a result, the plurality of first belt packs 250 and the sixth to ninth belt packs 251, 253, 255 and 257 within the transmission radii of the master base station 220 and the at least one second remote base station 231, 233, 235 and 237 may transmit and receive the data signal of digital type with each other wiredly and wirelessly.

Therefore, in the digital wireless intercom system 210 according to the second embodiment of the present invention, the master base station 220 expands a distance of communication to the plurality of second to fifth belt packs 252, 254, 256 and 258 outside the transmission radius, which is a shadowed area in the first building, without additional installation cost and additional maintenance cost. Further, the master base station 220 expands the distance of communication to the plurality of sixth to ninth belt packs 251, 253, 255 and 257 in the second building different from the first building where the master base station 220 is located.

In the digital wireless intercom system according to the first and second embodiments of the present invention, the synchronization signal and the data signal of digital type are transmitted and received by the timing division method, and the timing division method for the second embodiment as an example will be illustrated in the accompanying drawing.

Figure 7:
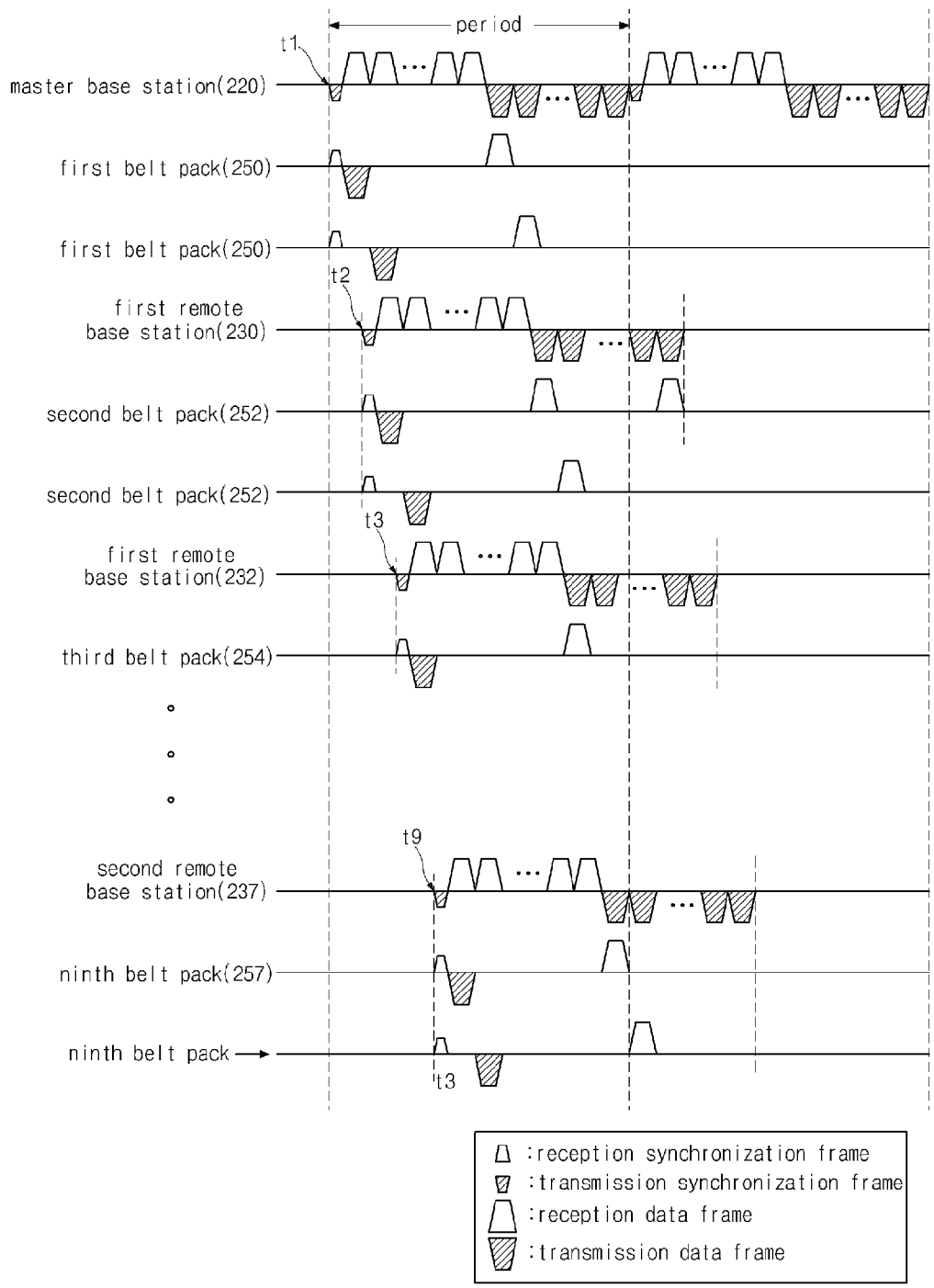
FIG. 7 is a view showing a transmission frame of a digital wireless intercom system according to a second embodiment of the present invention.

FIG. 7 is a view showing a transmission frame of a digital wireless intercom system according to a second embodiment of the present invention and will be illustrated together with FIG. 6.

In FIG. 7, a transmission frame of each of the master base station 220, the at least one first remote base station 230, 232, 234 and 236 and the at least one second remote base station 231, 233, 235 and 237 includes a transmission synchronization frame for the transmitted synchronization signal, a plurality of reception data frames for the received data signal of digital type and a plurality of transmission data frames for the transmitted data signal of digital type. The transmission synchronization frame, the plurality of reception data frames and the plurality of transmission data frames constitute one period.

In addition, a transmission frame of each of the plurality of first belt packs 250 within a transmission radius of the master base station 220, the plurality of first to fifth belt packs 250, 252, 254, 256 and 258 within a transmission radius of the at least one first remote base station 230, 232, 234 and 236 and the plurality of sixth to ninth belt packs 251, 253, 255 and 257 within a transmission radius of the at least one second remote base station 231, 233, 235 and 237 includes a reception synchronization frame for the received synchronization signal, the plurality of transmission data frames for the transmitted data signal of digital type and the plurality of reception data frames for the received data signal of digital type. The reception synchronization frame, the plurality of transmission data frames and the plurality of reception data frames constitute one period.

Here, the reception synchronization frame, the plurality of transmission data frames and the plurality of reception data frames of the plurality of first to ninth belt packs 250, 252, 254, 256, 258, 251, 253, 255 and 257 correspond to the transmission synchronization frame, the plurality of reception data frames and the plurality of transmission data frames, respectively, corresponding base station among the master base station 220, the at least one first remote base station 230, 232, 234 and 236 and the at least one second remote base station 231, 233, 235 and 237.

Each of the plurality of first to ninth belt packs 250, 252, 254, 256, 258, 251, 253, 255 and 257 receives the synchronization signal from the corresponding base station among the master base station 220, the at least one first remote base station 230, 232, 234 and 236 and the at least one second remote base station 231, 233, 235 and 237 and is synchronized with the received synchronization signal.

In addition, each of the plurality of first to ninth belt packs 250, 252, 254, 256, 258, 251, 253, 255 and 257 transmits and receives the data signal of digital type with the corresponding base station.

Each of the master base station 220, the at least one first remote base station 230, 232, 234 and 236 and the at least one second remote base station 231, 233, 235 and 237 receives the data signal of digital type as the plurality of reception data frames from the first to ninth belt packs 250, 252, 254, 256, 258, 251, 253, 255 and 257, and generates the plurality of transmission data frames which are mapped on the received plurality of reception data frames with one-to-one correspondence. Each of the master base station 220, the at least one first remote base station 230, 232, 234 and 236 and the at least one second remote base station 231, 233, 235 and 237 transmits the generated plurality of transmission data frames to the plurality of first to ninth belt packs 250, 252, 254, 256, 258, 251, 253, 255 and 257 wirelessly, and transmits the generated plurality of transmission data frames to the master base station 220, the at least one first remote base station 230, 232, 234 and 236 and the at least one second remote base station 231, 233, 235 and 237 except the corresponding base station itself wiredly.

The transmission frames of the master base station 220, the at least one first remote base station 230, 232, 234 and 236 and the at least one second remote base station 231, 233, 235 and 237 have different starting timings of period.

For example, the master base station 220 may have a first time t1 as the starting timing of the transmission frame. The at least one first remote base station 230, 232, 234 and 236 and the at least one second remote base station 231, 233, 235 and 237 may have second to ninth times t2 to t9 different from the first time t1, respectively, as the starting timings of the transmission frame.

Accordingly, the master base station 220, the at least one first remote base station 230, 232, 234 and 236 and the at least one second remote base station 231, 233, 235 and 237 transmit and receive the data signal of digital type with each other wiredly in an asynchronization state, and the master base station 220, the at least one first remote base station 230, 232, 234 and 236 and the at least one second remote base station 231, 233, 235 and 237 transmit and receive the data signal of digital type with the belt packs wirelessly in a synchronization state.

In the digital wireless intercom system 210 according to the second embodiment of the present invention, each of the plurality of first to ninth belt packs 250, 252, 254, 256, 258, 251, 253, 255 and 257 transmits and receives the data signal of digital type with corresponding one of the master base station 220, the at least one first remote base station 230, 232, 234 and 236 and the at least one second remote base station 231, 233, 235 and 237 using available (not assigned) one of the plurality of transmission data frames and available one of the plurality of reception data frames.

In the pursuit of this purpose, each of the plurality of first to ninth belt packs 250, 252, 254, 256, 258, 251, 253, 255 and 257 receives an available frame information regarding the available transmission and reception frames from the corresponding one of the master base station 220, the at least one first remote base station 230, 232, 234 and 236 and the at least one second remote base station 231, 233, 235 and 237, and selects the transmission frame and the reception frame for use using the received available frame information.

In addition, each of the plurality of first to ninth belt packs 250, 252, 254, 256, 258, 251, 253, 255 and 257 generates a used frame information regarding the selected transmission and reception frames, and transmits the generated used frame information to the corresponding one of the master base station 220, the at least one first remote base station 230, 232, 234 and 236 and the at least one second remote base station 231, 233, 235 and 237.

For example, the master base station 220 may add the available frame information regarding the available transmission data frames and the available reception data frames to the synchronization signal of the transmission and reception synchronization frames and may transmit the synchronization signal to the plurality of first belt packs 250. Each of the plurality of first belt packs 250 may select one of the available transmission data frames and the available reception data frames for transmission and reception of the data signal of digital type using the available frame information. In addition, each of the plurality of first belt packs 250 may generate the used frame information regarding the selected transmission data frame and the selected reception data frame and may add the generated used frame information to the data signal of transmission and reception data frames. Each of the plurality of first belt packs 250 may transmit the data signal to the master base station 220.

Here, the used frame information may include a frame identification number of the selected transmission and reception data frames and an audio call group identification number.

Further, the master base station 220, the at least one first remote base station 230, 232, 234 and 236 and the at least one second remote base station 231, 233, 235 and 237 transmit and receive the available frame information with each other wiredly. The master base station 220, the at least one first remote base station 230, 232, 234 and 236 and the at least one second remote base station 231, 233, 235 and 237 may transmit and receive the available frame information every period of the transmission frame or whenever the available frame information is updated.

Accordingly, the master base station 220, the at least one first remote base station 230, 232, 234 and 236, the at least one second remote base station 231, 233, 235 and 237 and the plurality of first to ninth belt packs 250, 252, 254, 256, 258, 251, 253, 255 and 257 of the digital wireless intercom system 210 according to the second embodiment of the present invention share the available frame information regarding the available transmission data frames and the available reception data frames with each other. When the plurality of first to ninth belt packs 250, 252, 254, 256, 258, 251, 253, 255 and 257 transmit a new data signal of digital type, the plurality of first to ninth belt packs 250, 252, 254, 256, 258, 251, 253, 255 and 257 may select one of the available transmission data frames and the available reception data frames using the available frame information.

Specifically, the master base station 220 may receive the used frame information added to the data signal of digital type from the at least one first remote base station 230, 232, 234 and 236 and the at least one second remote base station 231, 233, 235 and 237 and may generates an updated available frame information by synthesizing and editing the received used frame information. The master base station 220 may transmit the updated available frame information to the at least one first remote base station 230, 232, 234 and 236 and the at least one second remote base station 231, 233, 235 and 237 every period or every time the available frame information is updated. As a result, mismatching of transmission frame (e.g., simultaneous selection of the same data frame by the plurality of belt packs) caused by signal delay and communication problems is prevented.

In addition, each of the plurality of first to ninth belt packs 250, 252, 254, 256, 258, 251, 253, 255 and 257 selects at least one of the plurality of reception data frames of the data signal of digital type wirelessly received from the corresponding one of the master base station 220, the at least one first remote base station 230, 232, 234 and 236 and the at least one second remote base station 231, 233, 235 and 237. Each of the plurality of first to ninth belt packs 250, 252, 254, 256, 258, 251, 253, 255 and 257 converts the digital type of the data signal of the selected at least one reception data frame to the analog type (digital-to-analog converting: DAC) and mixes the data signals of analog type. As a result, the user may simultaneously listen to the audios of the plurality of belt packs of the same audio call group.

The digital wireless intercom system according to the first and second embodiments of the present invention transmits and receives the data signal of digital type wiredly using the Ethernet (LAN), the infrastructure (LAN infrastructure) and the internet. For the purpose of improving different delay times of the wired transmission and reception, each base station may include a reception buffer memory by transmission frame, and the buffer memory for the second embodiment as an example will be illustrated in the accompanying drawings.

Figure 8:
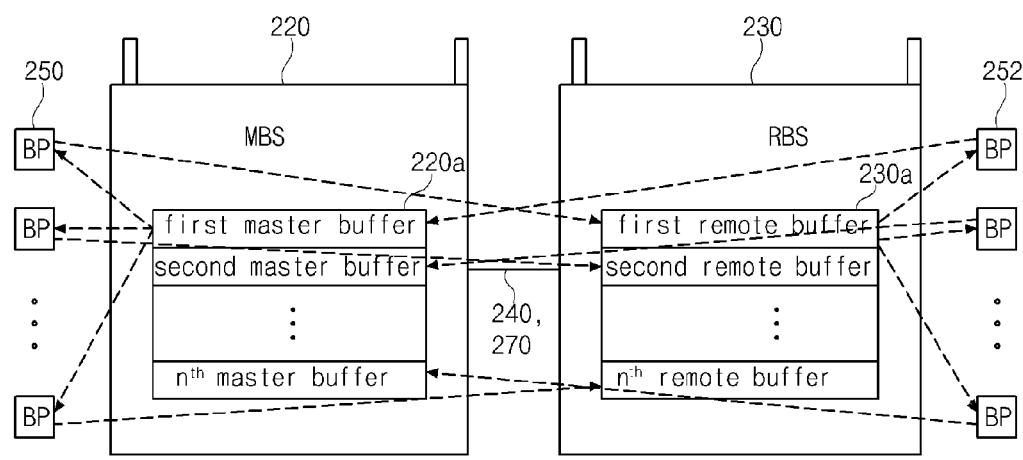
FIG. 8 is a view showing a master base station and a first remote base station of a digital wireless intercom system according to a second embodiment of the present invention.

FIG. 8 is a view showing a master base station and a first remote base station of a digital wireless intercom system according to a second embodiment of the present invention.

In FIG. 8, the master base station 220 and the first remote base station 230 of the digital wireless intercom system according to the second embodiment of the present invention transmit and receive the synchronization signal including the available frame information and the data signal of digital type with each other wiredly through at least one of the Ethernet 240 and the infrastructure 270.

Here, the first remote base station 230 may be one of the at least one first remote base station 230, 232, 234 and 236 (of FIG. 6) and the at least one second remote base station 231, 233, 235 and 237 (of FIG. 6). The at least one second remote base station may transmit and receive the synchronization signal and the data signal of digital type with the master base station 220 wiredly through the Ethernet 240, the infrastructure 270 and 272 (of FIG. 6) and the internet 280 (of FIG. 6).

The master base station 220 transmits and receives the synchronization signal and the data signal of digital type with the plurality of first belt packs 250 within the transmission radius wirelessly, and the first remote base station 230 transmits and receives the synchronization signal and the data signal of digital type with the plurality of second belt packs 252 within the transmission radius wirelessly. The data signal of digital type which each belt pack transmits to each base station may include the audio data and the available frame information, the data signal of digital type which each base station transmits to each belt pack may include the audio data.

Each of the master base station 220 and the first remote base station 230 may include a reception buffer memory 220a and 230a by transmission frame, and the buffer memory 220a and 230a may include a plurality of buffers (first to $n^{th}$ master buffers, first to $n^{th}$ remote buffers) the number of which is the same as the number of transmission frames (n) (i.e., the number of simultaneously available channels).

When the master base station 220 transmits the data signal of digital type which is received from the first remote base station 230 wiredly to the plurality of first belt packs 250 within the transmission radius wirelessly, the different wired delays may be caused according to a kind and a state of the wired network between the master base station 220 and the first remote base station 230.

For example, the wired delay may be relatively small when the master base station 220 and the first remote base station 230 are connected through the Ethernet 240, while the wired delay may vary with relatively large amount according to a traffic state when the master base station 220 and the fifth remote base station 231 are connected through the infrastructure 270 and the internet 280.

The transmission frames of the data signal of digital type transmitted by the master base station 220 and the first remote base station 230 have different starting timings of period. In addition, the starting timings of period may vary by a time shift phenomenon. The different wired delays and the different starting timings may cause deterioration such as an audio disconnection in each belt pack.

For the purpose of preventing the deterioration such as an audio disconnection by compensating the different wired delays due to the wired network and the different starting timings of period, in the digital wireless intercom system 210 according to the second embodiment of the present invention, after the master base station 220 and the first remote base station 230 may store the data signal of digital type received wiredly in the plurality of buffers (first to $n^{th}$ master buffers, first to $n^{th}$ remote buffers) by the plurality of transmission frames (first to $n^{th}$ transmission frames), after the master base station 220 and the first remote base station 230 may transmit the data signal of digital type by transmission frame stored in the plurality of buffers to the plurality of first and second belt packs 250 and 252 when a predetermined reference of reception delay is satisfied.

For example, the plurality of buffers may include a variable buffer a capacity of which can be varied, and it may be determined as a transmission reference that the data signal of digital type is transmitted to the plurality of first and second belt packs 250 and 252 when the set capacity of the variable buffer is filled up with the transmission frames.

Accordingly, the delay is minimized and the deterioration such as an audio disconnection is prevented by controlling the capacity of the plurality of buffers of the buffer memories 220a and 230a of the master base station 220 and the first remote base station 230.

Although not shown, when the traffic state of the infrastructure is poor, for the purpose of minimizing the wired delay and reducing the maximum capacity of the plurality of buffers, an additional line may be installed using the hubs 260, 262, 264 and 266 (of FIG. 6) where the Ethernet 240 is connected. Alternatively, a portion of the lines for the Ethernet 240 may be used for transmitting a signal to keep the synchronization.

In addition, for the purpose of reducing the delay caused by the asynchronization in the starting timing of period of the transmission frame, the master base station 220 may transmit an auxiliary synchronization signal to the first remote base station 230 wiredly. The first remote base station 230 may judge the auxiliary synchronization signal within a predetermined time deviation as a signal having no delay and may re-adjust the synchronization to keep the wired synchronization.

A plurality of master base stations connected to each other wiredly and sharing information of used frequencies may be used to increase the number of belt packs, and the digital wireless intercom system will be illustrated in the accompanying drawing.

Figure 9:
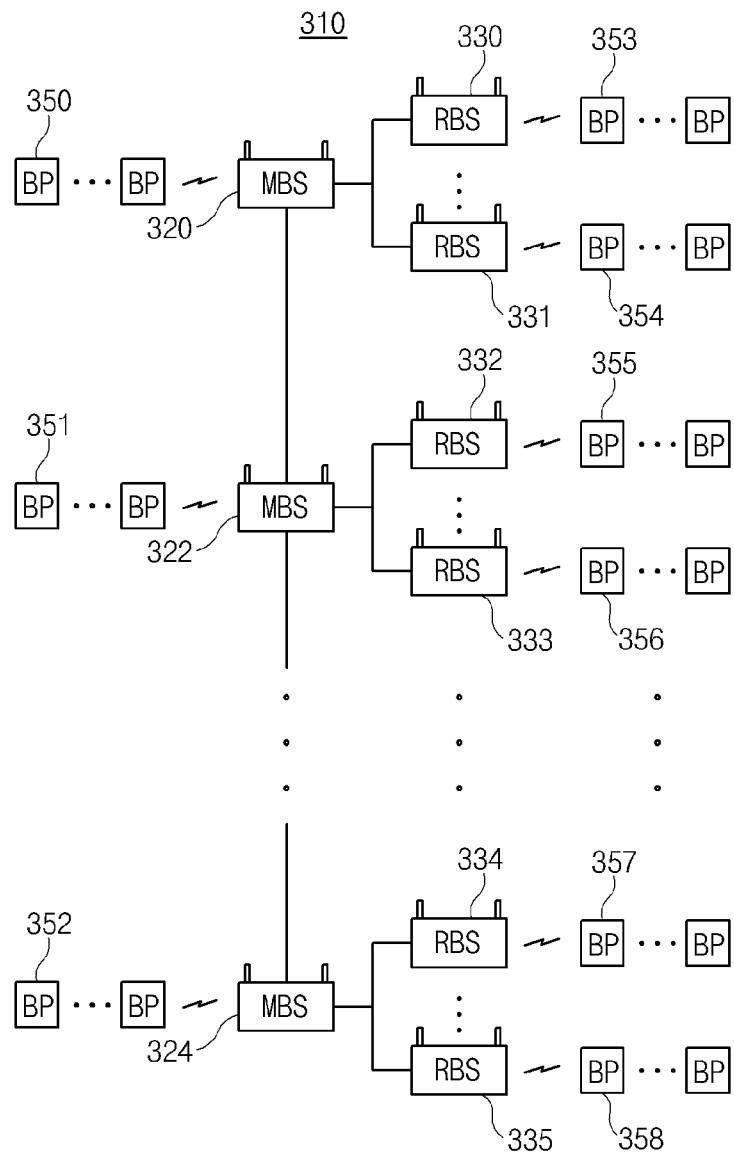
FIG. 9 is a view showing a digital wireless intercom system according to a third embodiment of the present invention.

FIG. 9 is a view showing a digital wireless intercom system according to a third embodiment of the present invention.

In FIG. 9, a digital wireless intercom system 310 according to a third embodiment of the present invention includes a plurality of master base stations (MBS) 320, 322 and 324, a plurality of remote base station (RBS) 330, 331, 332, 333, 334 and 335 and a plurality of belt packs (BP) 350, 351, 352, 353, 354, 355, 356, 357 and 358.

The first, second, . . . and $n^{th}$ master base stations 320, 322 and 324 are connected to each other wiredly through a leased line such as an Ethernet to transmit and receive a synchronization signal and a data signal of digital type. The first, second, . . . and $n^{th}$ master base stations 320, 322 and 324 share information regarding used frequencies to keep a mutual synchronization.

In addition, the first, second, . . . and $n^{th}$ master base stations 320, 322 and 324 transmit and receive the synchronization signal and the data signal of digital type with the plurality of belt packs 350, 351 and 352, respectively, within a transmission radius wirelessly through different independent frequencies.

Further, the first, second, . . . and $n^{th}$ master base stations 320, 322 and 324 are connected to at least one first, second, . . . and $n^{th}$ remote base stations (330, 331), (332, 333), . . . and (334, 335), respectively, through the Ethernet wiredly to transmit and receive the synchronization signal and the data signal of digital type. The at least one first, second, . . . and $n^{th}$ remote base stations (330, 331), (332, 333), . . . and (334, 335) transmit and receive the synchronization signal and the data signal of digital type with the plurality of belt packs 353, 354, 355, 356, . . . , 357 and 358, respectively, within the transmission radius wirelessly through different independent frequencies.

As a result, the plurality of belt packs 350 within the transmission radius of the first master base station 320 may exchange audio information with the plurality of belt packs 353 and 354 within the transmission radius of the at least one first remote base station 330 and 331 connected to the master base station 320 wiredly. In addition, the plurality of belt packs 350 within the transmission radius of the first master base station 320 may exchange audio information with the plurality of belt packs 357 and 358 within the transmission radius of the at least one $n^{th}$ remote base station 334 and 335 connected to the master base station 320 wiredly. Accordingly, the number of simultaneous users for a multimedia device increases.

Consequently, in the digital wireless intercom system according to an embodiment of the present invention, restriction in installation of the digital wireless intercom system according to the related art is settled to provide various functions such as high sound quality, duplex communication and central monitoring. As a result, the digital wireless intercom system as a general equipment substituting the existing analog radio is fabricated Specifically, the wireless shadowed area resulting from the basic problems of the digital wireless intercom system according to the related art using the WLAN, the DECT, the FSK transceiver, i.e., the limitation of transmission distance due to low output power and high frequency is eliminated, and the digital wireless intercom system is simply installed without an additional leased equipment of high cost. As a result, generalization is accelerated.

In addition, the present invention may be applied to the digital wireless intercom system using a next generation technology such as a multiple-input multiple-output (MIMO) antenna technology and ultra wide band (UWB) where commercialization is accelerated and 802.11ac and 802.11ad where standardization is performed to improve quality and distance simply by using the existing infrastructure. As a result, commercialization of various digital wireless intercom systems having high quality can be accelerated.

The present invention is not limited to the embodiments described herein, and various modifications and variations can be made in the present invention.

The invention claimed is:

1. A digital wireless intercom system, comprising:
   at least one master base station;
   at least one remote base station connected to the at least one master base station wiredly through at least one of a local area network, a local area network infrastructure and an internet, the at least one remote base station transmitting and receiving a synchronization signal and a data signal of digital type with the at least one master base station;

a plurality of first belt packs within a transmission radius of the at least one master base station, the plurality of first belt packs transmitting and receiving the synchronization signal and the data signal with the at least one master base station wirelessly; and a plurality of second belt packs within a transmission radius of the at least one remote base station, the plurality of second belt packs transmitting and receiving the synchronization signal and the data signal with the at least one remote base station wirelessly, wherein the at least one master base station and the at least one remote base station are driven with different independent frequencies based on a frequency interference situation, wherein a transmission frame of each of the at least one master base station and the at least one remote base station includes a transmission synchronization frame, a plurality of reception data frames and a plurality of transmission data frames constituting a period, and wherein a starting timing of the period of the transmission frame of the synchronization signal and the data signal transmitted and received between the at least one master base station is different from a starting timing of the period of the transmission frame of and the at least one remote base station have different starting timings of period.

2. The digital wireless intercom system according to claim 1, wherein the synchronization signal and the data signal are transmitted and received by a time division wireless communication method having a same transmission frame structure.

3. The digital wireless intercom system according to claim 1, wherein the at least one master base station and the at least one remote base station add an available frame information regarding a plurality of transmission frames available to the synchronization signal, wherein the at least one master base station and the at least one remote base station transmit the synchronization signal to the plurality of first belt packs and the plurality of second belt packs, respectively, wherein the plurality of first belt packs and the plurality of second belt packs select one of the plurality of transmission frames using the available frame information, wherein the plurality of first belt packs and the plurality of second belt packs add a used frame information regarding the selected one of the plurality of transmission frames to the data signal, and wherein the plurality of first belt packs and the plurality of second belt packs transmit the data signal to the at least one master base station and the at least one remote base station, respectively.

4. The digital wireless intercom system according to claim 3, wherein the at least one master base station generates an updated available frame information by synthesizing and editing the used frame information, and wherein the at least one master base station transmits the updated available frame information to the at least one remote base station every period or every time the available frame information is updated.

5. The digital wireless intercom system according to claim 1, wherein the at least one master base station and the at least one remote base station include a buffer memory by transmission frame for compensating the different starting timings of period and a wired delay, and wherein the buffer memory includes a plurality of variable buffers a capacity of which is capable of being varied.

6. The digital wireless intercom system according to claim 1, wherein after the at least one master base station and the at least one remote base station recover an error of the data signal received from the plurality of first belt packs and the plurality of second belt packs, the at least one master base station and the at least one remote base station transmit the data signal to each other wiredly.

7. The digital wireless intercom system according to claim 1, wherein the at least one master base station transmits an auxiliary synchronization signal to the at least one remote base station wiredly, and wherein the at least one remote base station keeps a synchronization state with the at least one master base station using the auxiliary synchronization signal.

8. The digital wireless intercom system according to claim 1, wherein the plurality of first belt packs and the plurality of second belt packs select the data signal corresponding to a predetermined audio group, and wherein the plurality of first belt packs and the plurality of second belt packs mix and simultaneously output the data signal.

9. The digital wireless intercom system according to claim 1, wherein the at least one master base station includes a plurality of master base stations transmitting and receiving the synchronization signal and the data signal with each other wiredly, and wherein the at least one remote base station includes a plurality of remote base stations transmitting and receiving the synchronization signal and the data signal with the plurality of master base stations wiredly.

10. The digital wireless intercom system according to claim 1, wherein the at least one master base station comprises:

a wired interfacing unit transmitting and receiving the data signal wiredly;

a wireless receiving unit receiving the data signal wirelessly;

an error recovery calculating unit receiving the data signal from the wireless receiving unit and recovering an error of the data signal;

a wireless transmitting unit transmitting the data signal wirelessly;

a first codec unit receiving the data signal of digital type from the wired interfacing unit and the error recovery calculating unit and converting the data signal of digital type to the data signal of analog type;

an analog signal outputting unit receiving the data signal of analog type from the first codec unit and transmitting the data signal of analog type to an audio output device;

an analog signal inputting unit receiving the data signal of analog type from an audio input device;

a second codec unit receiving the data signal of analog type from the analog signal inputting unit and converting the data signal of analog type to the data signal of digital type; and a controlling unit controlling the wired interfacing unit, the wireless receiving unit and the wireless transmitting unit.

11. The digital wireless intercom system according to claim 10, wherein the at least one master base station further comprises:

a first mixer synthesizing the data signal and transmitting the data signal to the audio output device; and a second mixer receiving the data signal from the audio input device and synthesizing the data signal.

12. The digital wireless intercom system according to claim 1, wherein the at least one remote base station comprises:

a wired interfacing unit transmitting and receiving the data signal wiredly;

a wireless receiving unit receiving the data signal wirelessly;

an error recovery calculating unit receiving the data signal from the wireless receiving unit and recovering an error of the data signal;

a wireless transmitting unit transmitting the data signal wirelessly; and a controlling unit controlling the wired interfacing unit, the wireless receiving unit and the wireless transmitting unit.

13. The digital wireless intercom system according to claim 1, wherein each of the plurality of first belt packs and the plurality of second belt packs comprises:

a wireless receiving unit receiving the data signal wirelessly;

an error recovery calculating unit receiving the data signal from the wireless receiving unit and recovering an error of the data signal;

a wireless transmitting unit transmitting the data signal wirelessly;

a first codec unit receiving the data signal of digital type from the error recovery calculating unit and converting the data signal of digital type to the data signal of analog type;

an analog signal outputting unit receiving the data signal of analog type from the first codec unit and transmitting the data signal of analog type to an audio output device;

an analog signal inputting unit receiving the data signal of analog type from an audio input device;

a second codec unit receiving the data signal of analog type from the analog signal inputting unit and converting the data signal of analog type to the data signal of digital type; and a controlling unit controlling the wireless receiving unit and the wireless transmitting unit.

14. A digital wireless intercom system, comprising:

at least one master base station;

at least one remote base station connected to the at least one master base station wiredly through at least one of a local area network, a local area network infrastructure and an internet, the at least one remote base station transmitting and receiving a synchronization signal and a data signal of digital type with the at least one master base station;

a plurality of first belt packs within a transmission radius of the at least one master base station, the plurality of first belt packs transmitting and receiving the synchronization signal and the data signal with the at least one master base station wirelessly; and a plurality of second belt packs within a transmission radius of the at least one remote base station, the plurality of second belt packs transmitting and receiving the synchronization signal and the data signal with the at least one remote base station wirelessly, wherein the at least one master base station and the at least one remote base station are driven with different independent frequencies based on a frequency interference situation, and wherein the synchronization signal and the data signal transmitted and received between the at least one master base station and the at least one remote base station have different starting timings of period, and wherein the at least one master base station includes a plurality of master base stations transmitting and receiving the synchronization signal and the data signal with each other wiredly, and wherein the at least one remote base station includes a plurality of remote base stations transmitting and receiving the synchronization signal and the data signal with the plurality of master base stations wiredly.

15. The digital wireless intercom system according to claim 14, wherein the at least one master base station comprises:

a wired interfacing unit transmitting and receiving the data signal wiredly;

a wireless receiving unit receiving the data signal wirelessly;

an error recovery calculating unit receiving the data signal from the wireless receiving unit and recovering an error of the data signal;

a wireless transmitting unit transmitting the data signal wirelessly;

a first codec unit receiving the data signal of digital type from the wired interfacing unit and the error recovery calculating unit and converting the data signal of digital type to the data signal of analog type;

an analog signal outputting unit receiving the data signal of analog type from the first codec unit and transmitting the data signal of analog type to an audio output device;

an analog signal inputting unit receiving the data signal of analog type from an audio input device;

a second codec unit receiving the data signal of analog type from the analog signal inputting unit and converting the data signal of analog type to the data signal of digital type; and a controlling unit controlling the wired interfacing unit, the wireless receiving unit and the wireless transmitting unit.

16. The digital wireless intercom system according to claim 14, wherein the plurality of first belt packs and the plurality of second belt packs select the data signal corresponding to a predetermined audio group, and wherein the plurality of first belt packs and the plurality of second belt packs mix and simultaneously output the data signal.

* * * * *